United States Patent [19]

Proulx et al.

[11] 3,946,472
[45] Mar. 30, 1976

[54] BROACHING TOOL

[75] Inventors: Sylvester Eugene Proulx, Windsor; Stanley Alexander Beneteau, Tecumseh, both of Canada

[73] Assignee: J. P. Tool Limited, Windsor, Canada

[22] Filed: Jan. 22, 1975

[21] Appl. No.: 543,172

[52] U.S. Cl. .................................... 29/95.1; 29/96
[51] Int. Cl.² .... B26D 1/04; B26D 1/00; B26D 1/12
[58] Field of Search .................... 29/95.1, 96, 105 R

[56] References Cited
UNITED STATES PATENTS

| | | | |
|---|---|---|---|
| 2,645,003 | 7/1953 | Thompson et al. | 29/105 R |
| 3,262,183 | 7/1966 | Raehrs | 29/95.1 |
| 3,371,397 | 3/1968 | Coleshill et al. | 29/105 R |
| 3,540,103 | 11/1970 | Saari | 29/105 R |
| 3,707,748 | 1/1973 | Price et al. | 29/95.1 |
| R28,239 | 11/1974 | Dupuis | 29/95.1 |

Primary Examiner—Leonidas Vlachos

[57] ABSTRACT

A broaching tool is described having an elongated tool body with a plurality of spaced ribs disposed generally transverse to the longitudinal body axis. Each such rib defines a substantially circular arc of at least 45°. A plurality of cylindrical cutter discs are mounted along each rib, each disc being positioned with its longitudinal axis disposed within 1°–15° of coincidence with the longitudinal axis of the body. Each disc has an end face providing a cutting edge disposed about the periphery of the end face. The discs along each arcuate row are circumferentially staggered with respect to the discs of the next adjacent rib with each disc projecting beyond the outer face of the rib and being rotatably indexable about its axis to bring successive cutting portions into cutting positions.

13 Claims, 4 Drawing Figures

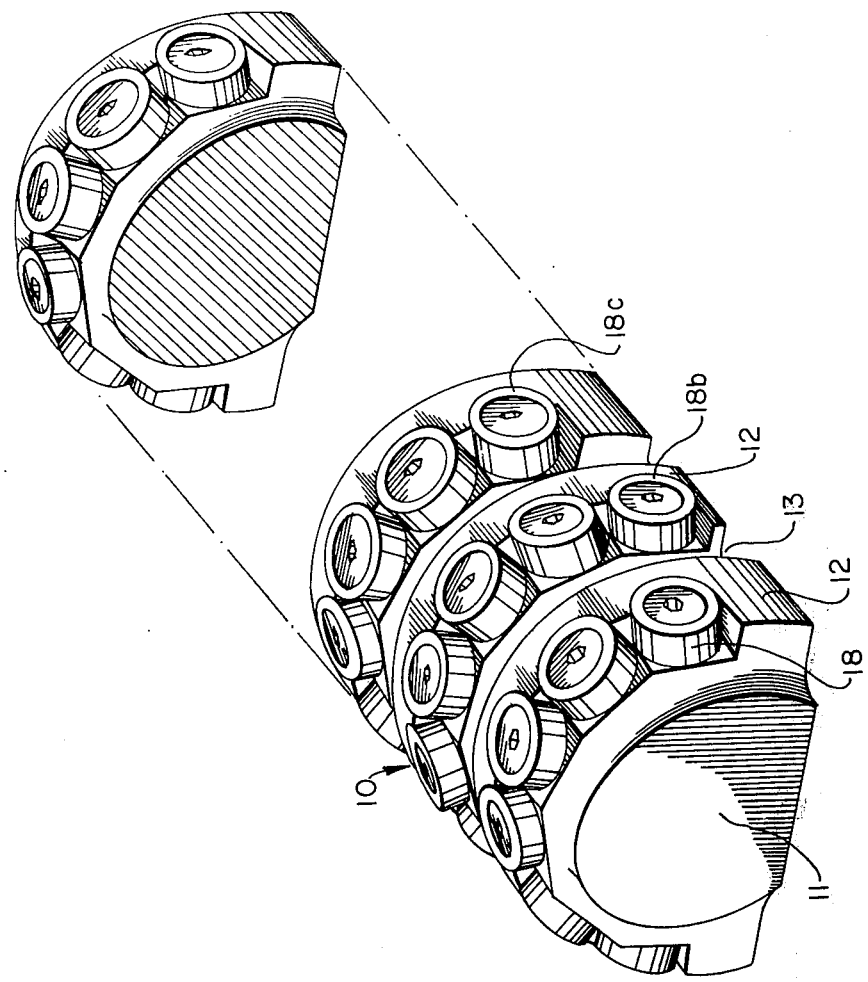

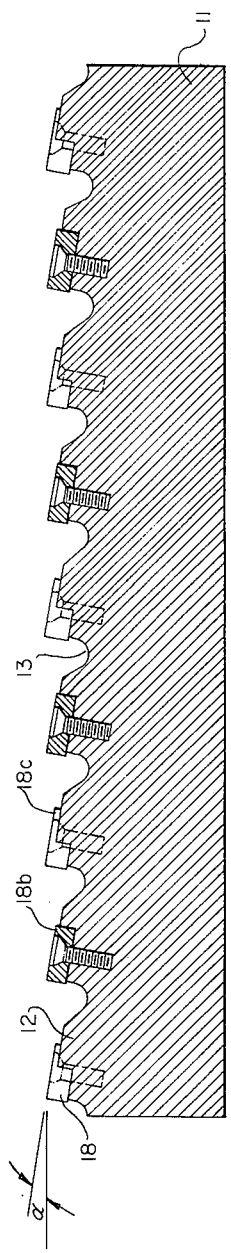
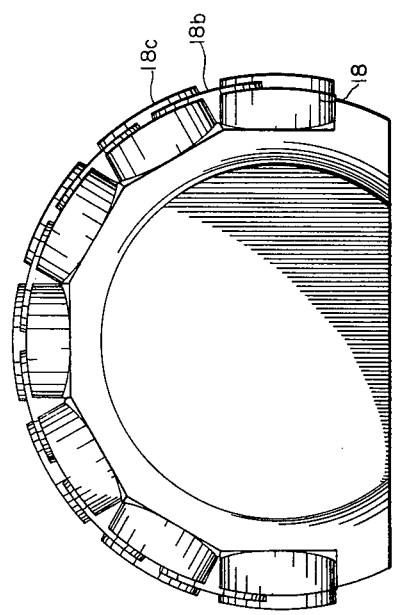
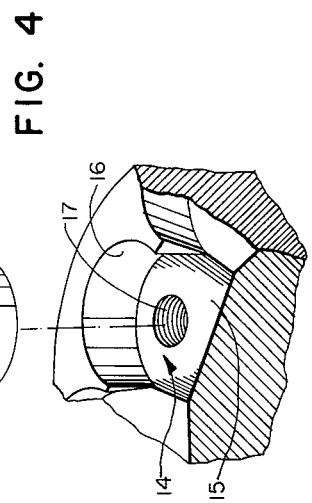

BROACHING TOOL

BACKGROUND OF THE INVENTION

1. Field of the Invention

This invention relates to a novel broaching tool of the type typically used to produce a round hole or a semicircle.

2. Description of the Prior Art

Broaching is a machining process whereby one or more cutters with a series of teeth are pushed or drawn entirely across a workpiece and is analogous to single-stroke filing. Broaching is typically carried out on manually-operated presses, on pull-screw machines or on hydraulically actuated broaching machines or presses. The broach has teeth which increase in height towards one end and is typically held in the screw socket of a broaching machine screw or ram by a taper cotter. Usually the first few teeth on the broach are low to permit the small end of the tool to pass through a hole in the workpiece, while the intermediate teeth remove most of the metal and the last few teeth finish the surface to size.

The typical broaching tool presently in use is in the form of an elongated body having a plurality of spaced annular ribs generally transverse to the longitudinal body of the axis. A series of titanium carbide teeth are brazed onto side walls of these ribs in a position perpendicular to the longitudinal body axis. Each of these teeth has a curved upper cutting edge. Of course, when these cutter teeth become worn, it becomes a very expensive proposition to remove the worn teeth and then braze new cutter teeth into position against the ribs. Also, because each cutting edge engages the workpiece at substantially 90°, it will be appreciated that immense stresses are placed on the tool and the cutter teeth particularly when broaching metals.

Similar cutting teeth are normally used on rotary milling cutters but recently some rotary milling cutters have been utilizing cutter teeth in the shape of buttons or discs which are indexably mountable on supporting ribs. One such device is described in Saari U.S. Pat. No. 3,540,103, issued Nov. 17, 1970. However, Saari was concerned only with a rotary milling cutter which was specially intended for truing wheels of railroad cars and locomotives.

It will, of course, be appreciated that broaching is a totally different kind of operation from rotary milling in that broaching involves no rotation and is strictly a pushing action similar to single stroke filling. It is the object of the present invention to provide an improved type of broaching tool having easily replaceable and rotatably indexable cutters.

SUMMARY OF THE INVENTION

According to the present invention it has been found that by designing a unique type of broaching tool support, cutter teeth in the form of cylindrical discs or buttons can be advantageously utilized in broaching.

Thus, in accordance with the present invention a novel broaching tool comprises an elongated tool body having a plurality of spaced ribs disposed generally transverse to the longitudinal body axis. Each of these ribs defines a substantially circular arc of at least 45°. A plurality of cylindrical cutter discs are mounted along each rib with each disc being positioned with its longitudinal axis disposed within 1°–15° of coincidence with the longitudinal axis of the tool body. Each disc has an end face providing a cutting edge disposed about the periphery of the end face with the discs along each rib being staggered circumferentially with respect to the discs of the next adjacent rib. Each disc projects beyond the outer face of the rib and is rotatably indexable about its axis to bring successive cutting edge portions into cutting position.

The ribs are preferably arranged as axially spaced annular projections and each rib may define a full circle or a part thereof. It forms an arc of at least 45° and usually at least 90°. Annular chip relief gaps are formed between the ribs.

The ribs have recessed into the upper face thereof cutter disc retaining sockets, each having a bottom face machined at a specific positive angle within the range of 1° to 15° of coincidence with the longitudinal axis of the tool body so as to result in a negative rake angle. Each socket has a rear abutment wall which engages the trailing side of the cutter and has an open front. The abutment wall is preferably perpendicular to the socket bottom wall and is also curved to conform to the curvature of the cutter. For securing a cutter disc in a socket, a tapped hole is preferably provided in the bottom wall of the socket for receiving a retaining screw extending through the cutter disc. The tapped hole is preferably positioned so as to firmly wedge the cutter disc against the abutment wall. Because of the lateral support given to the cutter by the sides of the socket, the screw is not subjected to shearing stresses but merely serves to hold the cutter firmly against the seat of the socket.

Preferably each succeeding rib is slightly larger than the preceeding rib so as to produce a progressively larger hole as the broach is moved through the workpiece or the workpiece over the broach. Alternatively, a portion of the broach can have a series of ribs machined to similar dimensions from the center line to the cutting disc sockets so as not to generate an increase in size but to afford a final finished round hole or circle of a specific size. It is also possible for all of the ribs to be machined to the same radius throughout the entire length of the broach so as not to generate any increase in size of the tool. With this arrangement the broach can be mounted on a subholder having an incline, thereby generating a larger circle on the workpiece as the broach passes through the workpiece or the workpiece over the broach.

The angle of the cutter discs with respect to the longitudinal axis of the body can be varied within the range of 1° to 15°. By setting the series of small round cutting discs at a small angle with respect to the longitudinal axis of the body, the cutting edges of the cutter discs thereby form small arcs of a much larger circle than the diameter of the discs themselves. This, combined with the overlapping in the paths of successive cutters due to the staggered arrangement of cutters in successive rows, results in the depth of the grooves formed on the finished surface being very small.

Certain preferred embodiments of this invention will now be illustrated by the attached drawings in which:

FIG. 1 is a perspective view of one embodiment of the novel broaching tool;

FIG. 2 is a cross-sectional view of the broaching tool;

FIG. 3 is an end elevation of the tool; and

FIG. 4 is an exploded detail view of a cutting disc and socket.

The particular broach illustrated in the drawings is for shaping and enlarging a semicircular hole. The novel broach 10 has an elongated tool holder body portion 11 having a series of axially spaced projecting annular ribs 12. Between these ribs 12 are chip gullies 13 and at the leading face of each rib 12 are machined a series of sockets 14 for receiving the cutter discs. Each of these sockets has a flat bottom face 15 which is inclined at a small angle α (usually about 11°) to the longitudinal axis of the tool holder 11 and the socket also has a semicircular abutment wall 16 which is perpendicular to the bottom face 15. Extending into the tool holder 11 through face 15 is a tapped hole 17.

Mounted in each socket 14 is a cylindrical cutting disc 18. Each cutting disc has a cylindrical wall 19 and end faces 20. A hole 21 is formed axially through the insert with a conical countersink 22. The cutting disc is typically made from tungsten carbide.

The cutting disc is held in position by means of a threaded screw 23 which has a conical head portion which mates with the countersink in the cutting disc and the head of the screw includes a socket 24 for receiving a wrench. When the cutting disc has been placed in position in the socket 14 and the screw tightened, the insert is pressing firmly against the semicircular wall 16. Thus, when the broach is in operation the forces on the cutting inserts are fully carried by the abutment walls 12 rather than by the screws themselves.

With this arrangement, it will be seen that only about one quarter of the cutting edge of the cutter discs is in use at one time. This means that as the portion in use becomes dulled, the screws 23 can be loosened and the cutter discs can then be rotated sufficiently to present fresh cutting edge portions, after which the screws are again tightened. The result is that as many as four cutting edge portions may be available on one face of a cutter disc. Furthermore, it is possible to make the discs reversible so that another four cutting edge portions may be available on the reverse face. In this way as many as eight fresh cutting edge portions may be obtainable from a single cutting disc.

A typical cutter disc may have a diameter ranging from about ⅜ inch to about 1 inch and these are used in cutting holes having a diameter of at least 1 inch. Usually the present broach forms a hole having a radius at least three times the radius of the individual cutter discs.

It will be seen from FIG. 1 that the various rows of cutting inserts are positioned in a circumferentially staggered manner. Thus, the axes of the second row of inserts 18b are positioned mid-way between the axes of the first row of inserts 18 while the third row of inserts 18c are in alignment with the first row 18.

As will be seen from FIG. 3, the broach is tapered with each row of inserts having a slightly larger radius than the previous row.

While the above preferred embodiment illustrates a screw connection for mounting the cutting inserts in the sockets, it will be readily apparent to those skilled in the art that many other kinds of mounting means are possible. Thus, wedging pin, etc. can be used.

It will also be apparent to those skilled in the art that although a semicircular broach is illustrated, similar types of broaches forming only a 45° arc or as much as a full circle are within the scope of the present invention.

We claim:

1. A broaching tool comprising an elongated tool body having a plurality of spaced ribs disposed generally transverse to the longitudinal body axis, each said rib defining an arcuate path of at least 45° with each succeeding rib having a larger diameter than the preceeding rib, a plurality of cylindrical cutter discs mounted along each rib, each disc having an end face providing a cutting edge disposed about the periphery of the end face, each disc being positioned with its end face disposed within 1°-15° of coincidence with the longitudinal axis of said body, the discs along each rib being staggered circumferentially with respect to the discs of the next adjacent rib such that the paths of successive cutter discs overlap, said discs being arranged to broach a hole having a radius at least three times the radius of the individual cutter discs, each disc projecting beyond the outer face of the rib and being rotatably indexable about its longitudinal axis to bring successive cutting portions into cutting position.

2. A broaching tool according to claim 1 wherein said cutter discs are recessed in retaining sockets in said ribs.

3. A broaching tool according to claim 2 wherein each said socket has a flat bottom face disposed within 1°-15° of coincidence with the longitudinal axis of the tool body and an arcuate rear abutment wall perpendicular to said bottom face.

4. A broaching tool according to claim 3 wherein the cutter disc is retained in said socket by means of a screw turned into a tapped hole in said socket bottom face.

5. A broaching tool according to claim 4 wherein said ribs are arranged as separate axially spaced annular projections.

6. A broaching tool according to claim 5 wherein each rib forms an arc of at least 90°.

7. A broaching tool according to claim 5 wherein each rib forms an arc of at least 180°.

8. A broaching tool holder comprising a tool body having a plurality of spaced ribs disposed generally transverse to the longitudinal body axis, each said rib defining an arcuate path of at least 45° with each succeeding rib having a larger diameter than the preceeding rib, a plurality of sockets formed along each rib adapted to receive and retain cylindrical cutter discs, each socket having a flat bottom face disposed within 1°-15° of coincidence with the longitudinal axis of the tool body and an arcuate rear abutment wall perpendicular to said bottom face, the sockets along each rib being staggered circumferentially with respect to the sockets of the next adjacent rib such that the paths of successive sockets overlap, said sockets being arranged such that the holder with cutter discs retained in the sockets is adapted to broach a hole having a radius at least three times the radius of the individual cutter discs.

9. A broaching tool holder according to claim 8 wherein said socket bottom face has a tapped hole for receiving a cutter disc retaining screw.

10. A broaching tool holder according to claim 9 wherein said ribs are arranged as separate axially spaced annular projections.

11. A broaching tool holder according to claim 10 wherein each rib forms an arc of at least 90°.

12. A broaching tool holder according to claim 10 wherein each rib froms an arc of at least 180°.

13. A broaching tool holder according to claim 10 wherein annular chip relief gaps are provided between said ribs.

\* \* \* \* \*